(12) United States Patent
Johnson et al.

(10) Patent No.: US 7,390,856 B2
(45) Date of Patent: Jun. 24, 2008

(54) METHOD FOR MAKING SELECTIVELY HYDROGENATED BLOCK COPOLYMERS OF VINYL AROMATIC HYDROCARBONS AND CONJUGATED DIENES

(75) Inventors: Kimberly A Johnson, Richmond, TX (US); Wouter de Jong, Amsterdam (NL); David K. Schisla, Pleasant Prairie, WI (US)

(73) Assignee: Kraton Polymers US, LLC, Houston, TX (US)

( * ) Notice: Subject to any disclaimer, the term of this patent is extended or adjusted under 35 U.S.C. 154(b) by 44 days.

(21) Appl. No.: 10/362,145

(22) PCT Filed: Aug. 24, 2001

(86) PCT No.: PCT/US01/26551

§ 371 (c)(1),
(2), (4) Date: Jul. 22, 2003

(87) PCT Pub. No.: WO02/16449

PCT Pub. Date: Feb. 28, 2002

(65) Prior Publication Data

US 2004/0014902 A1    Jan. 22, 2004

Related U.S. Application Data

(60) Provisional application No. 60/227,891, filed on Aug. 25, 2000.

(51) Int. Cl.
C08C 19/02   (2006.01)
C08F 236/10  (2006.01)

(52) U.S. Cl. .................. 525/338; 525/332.9; 526/340

(58) Field of Classification Search .............. 525/338, 525/332.9, 370, 384; 526/340
See application file for complete search history.

(56) References Cited

U.S. PATENT DOCUMENTS 3,415,759 A    12/1968  Johnson
3,957,914 A *  5/1976  Baumgartner ................ 525/54
4,207,409 A    6/1980  Ladenberger et al.
5,057,582 A    10/1991 Hoxmeier et al.
5,132,372 A *  7/1992  Chamberlain et al. ....... 525/338
5,143,990 A *  9/1992  Gibler et al. .................. 526/82
5,151,475 A    9/1992  Stevens et al.
5,281,696 A *  1/1994  Gibler ........................ 528/485
5,998,544 A *  12/1999 Gottschalk et al. ........ 525/92 D
6,222,008 B1 * 4/2001  Gelles ........................ 528/480

FOREIGN PATENT DOCUMENTS

DE   1920403    10/1969
DE   27 48 884   5/1979
GB   1020720    2/1966
WO   91/18025   11/1991

* cited by examiner

Primary Examiner—Roberto Rabago
(74) Attorney, Agent, or Firm—Michael A. Masse

(57) ABSTRACT

Disclosed is a method for making selectively hydrogenated block copolymers of vinyl aromatic hydrocarbons and conjugated dienes comprising: a) anionically polymerizing vinyl aromatic hydrocarbons and conjugated dienes to produce block copolymers with living chain ends; b) terminating the living chain ends; to produce a terminated block copolymer, with a member from the group consisting of an alcohol, hydrogen, and mixtures thereof, to prepare a terminated block copolymer; and c) contacting the terminated block copolymers with hydrogen at a temperature of from 20 to 175° C. in the presence of a catalyst prepared by combining a cobalt carboxylate with an aluminum alkyl, wherein: (i) if the polymer is terminated with an alcohol and the alcohol is a linear alcohol, the linear alcohol is used to terminate the living chain ends in an amount such that the alcohol:living chain end molar ratio is from 0.05 to 1.2: (ii) if the polymer is terminated with an alcohol and the alcohol is a branched alcohol, the branched alcohol is used to terminate the living chain ends in an amount such that the alcohol:living chain end molar ration is from 0.05 to about 3.0: an (iii) if the polymer is terminated with an alcohol and the alcohol is a mixture of a linear alcohol and a branched alcohol, the linear alcohol is used to terminate the living chain ends in an amount such that the linear alcohol: living chain end molar ration is from 0.05 to 1.2.

27 Claims, No Drawings

METHOD FOR MAKING SELECTIVELY HYDROGENATED BLOCK COPOLYMERS OF VINYL AROMATIC HYDROCARBONS AND CONJUGATED DIENES

This application claims the benefit of U.S. Provisional Application Ser. No. 60/227,891, filed Aug. 25, 2000.

FIELD OF THE INVENTION

This invention relates to a method for hydrogenating polymers which contain ethylenic unsaturation. This invention particularly relates to a method for selectively hydrogenating block copolymers of vinyl aromatic hydrocarbons and conjugated dienes.

BACKGROUND OF THE INVENTION

Catalysts and methods for hydrogenating chemical compounds containing ethylenic and/or aromatic unsaturation are known and are described in, for example, U.S. Pat. Nos. 3,415,759 and 5,057,582. The older prior art describes the use of heterogeneous catalysts such as nickel on supports such as kieselguhr (diatomaceous earth) and Raney nickel. More recently, the use of homogeneous catalyst systems have been reported, especially when selective hydrogenation as between ethylenic and aromatic unsaturation was desired.

Catalysts useful for selective hydrogenation are made by contacting one or more Group VIII metal carboxylates (carboxylates of Fe, Ru, Os, Co, Rh, Ir, Ni, Pd, Pt) with one or more aluminum alkyls. Such catalysts can produce excellent results in that they selectively hydrogenate ethylenic unsaturation to a high degree while not hydrogenating aromatic unsaturation.

Hydrogenation of block copolymers has been studied since the 1960s. Much work has been focused on the use of homogeneous Ziegler-type catalysts prepared by alkyl aluminum reduction of various Group VIII metal carboxylates. In this large body of work, nickel and cobalt have often been compared and reported to have similar activity.

In the 1960s and 1970s the reaction kinetics in the field of anionic polymerization that were available to researchers were almost exclusively done by hand and reactions were deemed to be "complete" simply by time. While this practice works and is capable of producing the desired block copolymers, variation in temperature profiles from batch to batch resulted in varying levels of "die-out"

Anionic polymerization is said to produce living polymer chains. "Anionic polymerization causes the formation of so-called 'living polymers' because the ionic sites remain active." Ulrich, *Introduction to Industrial Polymers*, p. 48 (1982). "Die-out" occurs when the living chains lose or otherwise have the ionic site become inactive. In cases of die-out, the chains are terminated prematurely and this can have several undesirable consequences such as the production of a wide molecular weight range.

Conventional computerized kinetics calculate monomer conversion as a function of the temperature profile and monomer concentration so that die-out is minimized. Improvements in gel permeation chromatography technology have allowed the further refining and fine tuning of the polymerization kinetics since the ability to detect and quantify subtle differences between polymers produced under different conditions has improved.

In the early development of the selective hydrogenation catalysts, it was very common to use a large excess of alcohol to terminate the polymerization. Living polymers had the potential to crosslink while awaiting hydrogenation and it was standard procedure to make certain that the polymer was completely terminated. It was not uncommon in lithium activated polymerizations to use alcohol to lithium molar ratios of 1.3 and above, even up to 2.0.

It would be desirable in the art of preparing hydrogenated block copolymers of vinyl aromatic hydrocarbons and conjugated dienes to selectively hydrogenate residual alkyl non-aromatic unsaturation. It would be particularly desirable in the art to perform such selective hydrogenation using a catalyst under conditions such that the hydrogenation is done more quickly and effectively. It would be more desirable still if the catalysts and conditions needed for the more effective hydrogenation were compatible with conventional equipment and processes for such hydrogenation.

SUMMARY OF THE INVENTION

In one aspect, the present invention is a method for making selectively hydrogenated block copolymers of vinyl aromatic hydrocarbons and conjugated dienes comprising: a) anionically polymerizing vinyl aromatic hydrocarbons and conjugated dienes to produce block copolymers with living chain ends; b) terminating the living chain ends with a member from the group consisting of an alcohol, hydrogen, and mixtures thereof, to prepare a terminated block copolymer; and c) contacting the terminated block copolymers with hydrogen at a temperature of from 20 to 175° C. in the presence of a catalyst prepared by combining a cobalt carboxylate with an aluminum alkyl, wherein: (i) if the polymer is terminated with an alcohol and the alcohol is a linear alcohol, the linear alcohol is used to terminate the living chain ends in an amount such that the alcohol:living chain end molar ratio is from 0.05 to 1.2; (ii) if the polymer is terminated with an alcohol and the alcohol is a branched alcohol, the branched alcohol is used to terminate the living chain ends in an amount such that the alcohol:living chain end molar ratio is from 0.05 to about 3.0; and (iii) if the polymer is terminated with an alcohol and the alcohol is a mixture of a linear alcohol and a branched alcohol, the linear alcohol is used to terminate the living chain ends in an amount such that the linear alcohol:living chain end molar ratio is from 0.05 to 1.2.

In another aspect, the present invention is a hydrogenated block copolymer of a vinyl aromatic hydrocarbon and a conjugated diene comprising a block copolymer prepared using the method of the present invention.

DETAILED DESCRIPTION OF THE INVENTION

In one embodiment, the present invention is a method for making selectively hydrogenated block copolymers of vinyl aromatic hydrocarbons and conjugated dienes using a cobalt catalyst prepared by combining a cobalt carboxylate with an aluminum alkyl. This cobalt catalyst is a known catalyst, however, in the early development of hydrogenation technology, researchers failed to observe the superior activity of the cobalt catalysts in polymer hydrogenation. The state of the technology in the 1960s did not allow researchers to reproducibly generate polymer feeds of sufficient quality for optimum cobalt catalyst performance and, as a result, activities similar to nickel catalysts were observed.

There were other reasons that the advantages of Co over the other Group VIII metal catalysts were not observed. For example, in the past, polymer cement samples were often generated and stored with an antioxidant or in a way that the cement was exposed to the atmosphere, e.g., exposed to water and oxygen. Within Shell research, much of the work done in the 1960s and 1970s was with feeds prepared at a manufacturing plant that had been treated with antioxidant and stored in drums under atmosphere. This practice carried on into the 1990s. The presence of such materials which contain, for example, an acidic proton, suppresses catalytic activity. Thus, until the 1990s, the importance of polymer feed quality for consistent hydrogenation performance was not fully understood.

Another reason that the superiority of Co catalysts has not been observed is it was not uncommon, in lithium activated polymerizations, to use alcohol to lithium molar ratios of 1.3 and above, even up to 2.0 for alcohol terminations. This use of large amounts of alcohol disguised the advantage of cobalt catalysts over nickel catalysts. Thus, in the 1960s it was not appreciated that there was any difference between the two catalysts, and nickel catalysts were chosen for commercial use because they were less expensive.

After better analytical techniques became available and a better understanding of the affect of polymer feed purity on the hydrogenation process was achieved, it was found that cobalt hydrogenation catalysts are highly active, much more active than similar nickel catalysts. Quite logically, the first hypothesis investigated was that the ratio of alcohol to cobalt catalyst, i.e., the alcohol/cobalt molar ratio, was the important factor in this inconsistency. It is not uncommon for catalysts to be poisoned and alcohols are known to poison catalysts under some conditions.

Quite surprisingly, it was found that the alcohol/cobalt molar ratio is not the determining factor in the activity of the catalyst. While not wishing to be bound by any theory regarding the operation of the method of the present invention, it is believed that the determining factor in catalyst activity is the overall molar ratio of the termination alcohol to the amount of lithium, i.e., living chain ends, in the polymer. If this ratio is greater than 1.2, and the alcohol is a linear primary alcohol, the activity of the cobalt catalyst is adversely affected. At any ratio less than or equal to 1.2 and more than or equal to 0, the cobalt catalysts achieve greater activity than similar nickel catalysts.

For the practice of the present invention, when a linear alcohol is used to terminate a block copolymer, preferably the overall molar ratio of the termination alcohol to the amount of lithium, i.e., living chain ends, in the polymer is from about 0.05 to about 1.20. More preferably, the ratio of alcohol to Li is from about 0.5 to 1.19. Most preferably, the ratio of alcohol to Li is from about 1.00 to about 1.10.

Another surprising observation is that while the primary linear alcohols suppress catalytic activity, branched alcohols either do not suppress catalytic activity, or at least suppress catalytic activity to a much lesser degree than the primary linear alcohols. Thus, an excess of branched alcohols can be used with the method of the present invention without suppressing the activity of the Co catalysts.

In the practice of the present invention, a black copolymner having living chains is terminated with an alcohol or hydrogen. The alcohol can be linear, branched or mixtures thereof. The linear alcohols are those which are both linear and primary. Linear alcohols usefisl with the method of the present invention include such alcohols as methanol, ethanol, n-propanol, n-butanol, and n-pentanol, but any alcohol which is both linear and primary can be used with the method of the present invention.

Examples of branched alcohols which can be used with the method of the present invention include: tertiary aliphatic alcohols, β-branched primary aliphatic alcohols, β,β-branched primary aliphatic alcohols, β,β-branched secondary aliphatic alcohols, and non-acidic or sterically hindered substituted phenols and benzyl alcohols.

Exemplary tertiary aliphatic alcohols include: 2-methyl-2-propanol (t-butanol), 2-methyl-2-butanol, 2,3-dimethyl-2-butanol, 2-methyl-2-pentanol, 3-methyl-3-pentanol, 3-ethyl-3-pentanol, 3-ethyl-2,2-dimethyl-3-pentanol,2-methyl-2-hexanol, 2,6-dimethyl-2-heptanol, and 3,7-dimethyl-3-octanol. Exemplary β-branched primary aliphatic alcohols include: 2-propyl-1-pentanol and 2-ethyl-1-hexanol. Exemplary β,β-branched primary aliphatic alcohols include: 2,2-dimethyl-1-propanol (neopentyl alcohol) and 2,2-dimethyl-1-butanol. Exemplary β,β-branched secondary aliphatic alcohols include 3,3-dimethyl-2-butanol and 2,2-dimethyl-3-pentanol. 2,6-di-t-butyl-4-methyl phenol is an exemplary non-acidic substituted phenol which can be used with the method of the present invention.

Methods for terminating living polymers such as those of the present invention are well known to those of ordinary skill in the art of preparing block copolymers and disclosed in references such as U.S. Pat. No. 5,143,990 to Gibler, et al., and U.S. Pat. No. 5,151,475 to Stevens, et al. It is often important that the copolymers be terminated prior to hydrogenation or exposure to the hydrogenation catalyst could also catalyze crosslinking which may not be desirable. Generally, the block copolymers of the present invention are terminated by admixing the living copolymers with an alcohol or hydrogen at a temperature of from about 40° C. to about 80° C. for from about 15 to about 60 minutes. The living polymer having active anionic sites are usually highly colored, such as the orange color of Li catalyzed living polymers. The absence of color can be used as an indicator that the polymer has been terminated.

The present invention is a method for making selectively hydrogenated block copolymers of vinyl aromatic hydrocarbons and conjugated dienes. This process utilizes a catalyst which is prepared by contacting one or more Co carboxylates with one or more aluminum alkyls. Optionally, another Group VIII metal carboxylate can be used in combination with the cobalt carboxylate. In such case, the cobalt must comprise at least 10 percent on a molar basis of the total metal present in the hydrogenation catalyst, preferably from 25 to 75 percent on a molar basis. The process may be used to selectively hydrogenate the ethylenic unsaturation in a block copolymer which contains both ethylenic and aromatic unsaturation.

Suitable carboxylate compounds useful with the method of the present invention include Group VIII metal carboxylates having the general formula $(RCOO)_nM$ where M is a Group VIII metal, R is a hydrocarbyl radical having from 1 to 50 carbon atoms, preferably from 5 to 30 carbon atoms, and n is a number equal to the valence of the metal M. Cobalt is required because it offers the highest activity, i.e., the highest conversion of double bonds per mole of metal used. Cobalt also allows substantial simplification of the block copolymer product clean-up step. Since catalyst use can be reduced by as much as 90%, the polymer can be handled less, such as by washing the polymer only a single time to remove catalyst rather than multiple times, resulting in lower production costs.

The carboxylates useful in preparing the catalyst of the present invention include Co and other Group VIII metal salts of hydrocarbon aliphatic acids, hydrocarbon cycloaliphatic acids, and hydrocarbon aromatic acids. Examples of the aliphatic acids include neodecanoic acid, hexanoic acid, ethyl hexanoic acid, heptanoic acid, octanoic acid, nonanoic acid, decanoic acid, dodecanoic acid, versatic acid, myristic acid, palmidic acid, stearic acid, oleic acid, linoleic acid, and rhodinoic acid, but any such acid can be used with the present invention. Examples of the cycloaliphatic acids include naphthanic acid, cyclohexyl carboxylic acid, and abietic-type resin acids, but any cycloaliphatic acid can be used with the present invention. Examples of the hydrocarbon aromatic acids include benzoic acid and alkyl-substituted aromatic acids in which the alkyl substitution has from 1 to 20 carbon atoms.

Preferred Co carboxylates include cobalt stearate, cobalt octanoate, cobalt neodecanoate, and cobalt versatate. Most preferably, the cobalt carboxylate is cobalt neodecanoate.

The method of the present invention can be practiced with a mixture of catalysts. Preferably the mixture of catalysts is a mixture of cobalt and nickel catalysts. More preferably, the Co carboxylate is combined with a nickel carboxylates selected from the group consisting of nickel octanoate, nickel stearate, nickel decanoate, and nickel acetylacetanoate.

In general, any of the aluminum alkyl compounds known to be useful in the preparation of olefin polymerization catalysts may be used separately or in combination in preparing the hydrogenation catalyst of this invention. U.S. Pat. No. 5,057,582, describes a wide variety of Group VIII metal compounds and aluminum alkyls which are useful in preparing the catalyst of this invention. Aluminum alkyls which can be used include organo aluminum compounds of the formula $R_nAlX_{3-n}$ wherein R is a hydrocarbon group of 1 to 10 carbon atoms, preferably 2 carbon atoms, X is hydrogen or R2, R2 is a hydrocarbon group of 1 to 10 carbon atoms which is different than R, and n is 1, 2, or 3, preferably 3. Aluminum trialkyls are preferred and triethyl aluminum is most preferred.

The aluminum alkyls are preferably used with the cobalt carboxylates in the practice of the present invention. Preferably, when used, the aluminum alkyls are used in a molar ratio of aluminum to cobalt of from 1:1 to 20:1. More preferably, the ratio of aluminum to cobalt is from 1:1 to 5:1. Most preferably, the ratio of aluminum to cobalt is from 1:1 to 2:1.

In general, the actual hydrogenation catalyst will be prepared by contacting the Co carboxylate with one or more aluminum alkyls in a suitable solvent at a temperature from 20 to 100° C. for from 1 to 120 minutes. If another Group VIII metal carboxylate is used, this same procedure can also be used to prepare it.

The solvent used for preparing the catalyst may be any one of those solvents known in the prior art to be useful for unsaturated hydrocarbon polymers. Suitable solvents include aliphatic hydrocarbons such as hexane, heptane, octane, and the like, cycloaliphatic hydrocarbons such as cyclopentane, cyclohexane, and the like, alkyl substituted cycloaliphatic hydrocarbons such as methyl cyclopentane, methyl cyclohexane, methyl cyclooctane, and the like, aromatic hydrocarbons such as benzene, hydroaromatic hydrocarbons such as decalin, tetralin, and the like, alkyl-substituted aromatic hydrocarbons such as toluene, xylene, and the like.

The hydrogenation method and catalyst of the present invention may be used to hydrogenate hydrocarbons which have ethylenic unsaturation, aromatic unsaturation, or both ethylenic and aromatic unsaturation. Preferably, the method of the present invention is used to hydrogenate ethylenic unsaturation in polymers containing only ethylenic unsaturation or to selectively hydrogenate only the ethylenic unsaturation of polymers containing both ethylenic and aromatic unsaturation. The method of the present invention can be used at reaction conditions including hydrogenation temperatures, hydrogen partial pressures, and holding times which will enable partial, complete, or selective hydrogenation. Any such conditions which are known to those of ordinary art skill in the art of hydrogenating polymers to be useful for hydrogenating polymers can be used with the method of the present invention.

The method and catalyst of this invention are particularly useful in hydrogenation of polymers containing polymerized diolefins or polymerized alkenyl aromatic hydrocarbons or polymers containing both polymerized diolefins and polymerized alkenyl aromatic hydrocarbons. It is in the latter case that selective hydrogenation is most important because very useful polymers can be produced by polymerizing blocks of diolefins and alkenyl or vinyl aromatic hydrocarbons and then selectively hydrogenating them such that the ethylenic unsaturation is hydrogenated while the aromatic unsaturation is not hydrogenated or at least wherein the amount of ethylenic unsaturation hydrogenated is significantly greater than the amount of aromatic unsaturation which is hydrogenated.

In one embodiment of the practice of the method of the present invention, polymers having living polymer chains are contacted with an alcohol, hydrogen, and a cobalt catalyst. Any such polymers can be used with the present invention, but preferably the polymers are block copolymers of vinyl aromatic hydrocarbons and conjugated dienes. These polymers are commonly prepared in solution with an anionic polymerization initiator. In general, polymers of this type are prepared by contacting the monomer or monomers to be polymerized with an organo alkali metal compound in a suitable solvent at a temperature within the range of from −150 to 300° C. but preferably in the range of 0 to 100° C. Particularly effective anionic polymerization initiators are organo lithium compounds having the general formula:

$$RLi$$

wherein R is an aliphatic, cycloaliphatic, aromatic, or alkyl-substituted aromatic hydrocarbon radical having from 1 to 20 carbon atoms.

Conjugated dienes which may be polymerized separately or in combination anionically include those containing from 4 to 12 carbon atoms such as 1,3-butadiene, isoprene, piperylene, methyl pentadiene, phenyl butadiene, and the like. The preferred conjugated dienes are butadiene and isoprene. Suitable vinyl aromatic hydrocarbon monomers include styrene, various alkyl-substituted styrenes, alkoxy-substituted styrenes, vinyl naphthalene, alkyl-substituted vinyl naphthalenes, and the like. Styrene is the preferred vinyl aromatic hydrocarbon.

The general method of hydrogenation is well known to those of ordinary skill in the art of preparing hydrogenated polymers and is well described in the literature. For example, such methods are described in U.S. Pat. Nos. 3,415,759 and 5,057,582. The hydrogenation of the unsaturated polymer may be accomplished in any of the solvents for such polymers known in the prior art. Specific suitable solvents include pentane, hexane, heptane, octane, cyclohexane, benzene, toluene, xylene, and the like. In general, the solution of polymer and solvent will contain from 1 to 30 percent by weight polymer and the balance solvent.

The hydrogenation is usually accomplished within the range of 20 to 175° C. at a total pressure within the range of 50 to 5000 psig (4.52 to 352.5 kgf/cm$^2$) at a hydrogen partial pressure within the range of 50 to 3000 psig (4.52 to 211.9 kgf/cm$^2$). Unlike with many prior art methods, the present invention can be utilized in a commercial process under reaction conditions at the less severe end of these ranges. For instance, it is quite possible to operate a commercial process at temperatures of from 40 to 100° C. and total pressures of from 50 to 1000 psig (4.52 to 71.3 kgf/cm²). The polymer is then contacted with hydrogen in the presence of the hydrogenation catalyst for a nominal holding time within the range of 10 to 360 minutes, preferably from 30 to 200 minutes.

The overall concentration of the catalyst in the hydrogenation mixture may range from 5 ppm metal/polymer to 300 ppm metal/polymer, but the necessary concentration is dependent upon the polymer to be hydrogenated. Higher molecular weight polymers tend to require higher levels of catalyst. Generally, the aluminum to cobalt molar ratio in the catalyst should be greater than 0.8, preferably great than 1.0. This ratio can provide reliable 98 percent or greater hydrogenation conversion of the residual double bonds in the polymer after three hours, an arbitrary time period based upon normal process residence time.

While the primary use of the method of the present invention is hydrogenating alcohol terminated block copolymers, it is also within the scope of the method of the present invention that the block copolymer can be both terminated using a termination agent selected from the group consisting alcohols, hydrogen, and mixtures thereof. For the purposes of the present invention, an block copolymer which is terminated with less than 0.05 alcohol:living chain end molar ratio is a hydrogen terminated block copolymer. The method of the present invention utilizing Co catalysts is also superior to methods using conventional Ni catalysts for hydrogenating hydrogen terminated block copolymers.

EXAMPLES

The following examples are provided to illustrate the present invention. The examples are not intended to limit the scope of the present invention and they should not be so interpreted. Amounts are in weight parts or weight percentages unless otherwise indicated.

Example 1

The experiments are conducted using a master batch of a linear triblock copolymer precursor solution. The polymer is a linear triblock copolymer of styrene and ethylene/butadiene, S-E/B-S, with a bound styrene content of 33% and having a number average molecular weight of about 181,000.

The master batch is prepared in a pilot plant reactor at a concentration of 14% wt polymer in a cyclohexane/diethyl-ether solution and terminated stoichiometrically with methanol. All hydrogenations are conducted in batch mode in 4 liter ZIPPERCLAVE* reactors (1560 g cement charge) at 75° C., 700 psig (50.21 kgf/cm²) $H_2$, d 1000 rpm. The catalyst concentration is 3 ppm M/solution (21 ppm M/polymer, M=Co or Ni). (*ZIPPERCLAVE is a trade designation of AUTOCLAVE ENGINEERS).

Catalysts are prepared as solutions having a Ni or Co concentration of 6000 parts per million (ppm). The catalysts are prepared using cobalt neodecanoate and Ni octoate by diluting the Co Ni carboxylate in cyclohexane and then slowly adding triethylaluminum to achieve a 2.0/1 molar ratio of Al/M (M=Co or Ni).

The polymer solution is charged to the reactor, heated to 75° C. and sparged with hydrogen at 700 psig (50.21 kgf/cm²) to saturate the solution. An alcohol is added as a solution in cyclohexane via high-pressure injection into the reactor. After thorough mixing for 5-10 minutes at 1000 rpm, the solution is checked for color, the absence of which indicates that the termination is complete. The catalyst solution is added, also via high-pressure injection and hydrogenation began. The hydrogenations are sampled at regular intervals and analyzed by $^1H$ NMR to determine the degree of conversion of alkyl unsaturation. The determinations are made by integrating the appropriate peaks using methods well known to those ordinary skill in the art of making such measurements.

Selection of metals, alcohols, aluminum to metal ratios, and alcohol to Li ratios are varied and the results are reported in Table 1 and Table 1A.

TABLE 1

| Run # | Catalyst | Al/M ratio | alcohol | molar alcohol/Li | free alcohol/M | free alcohol/Al | % conv @ 1 hr | % conv @ 2 hr | % conv @ 3 hr |
|---|---|---|---|---|---|---|---|---|---|
| 1 | 24559-111 | 2.0 Co | MeOH | 1.0 | 0.00 | 0.00 | 97.1 | 97.9 | 98.2 |
| 2 | 24559-111 | 2.0 Co | MeOH | 1.1 | 1.53 | 0.76 | 94.9 | 96.7 | 97.5 |
| 3 | 21470-185 | 2.0 Co | MeOH | 1.1 | 1.53 | 0.76 | 98.0 | 98.4 | 98.6 |
| 4 | 21470-185 | 2.0 Co | MeOH | 1.2 | 3.05 | 1.53 | 78.7 | 85.6 | 88.3 |
| *5 | 21470-185 | 2.0 Co | MeOH | 1.3 | 4.58 | 2.29 | 66.2 | 73.9 | 77.6 |
| 6 | 24559-111 | 2.0 Co | 2-EH/MeOH | 0.2/1 | 3.05 | 1.53 | 97.2 | 98.5 | 98.7 |
| 7 | 24559-111 | 2.0 Co | 2-EH/MeOH | 0.3/1 | 4.58 | 2.29 | 97.1 | 98.4 | 99.1 |
| 8 | 24559-113 | 1.3 Co | MeOH | 1.0 | 0.00 | 0.00 | 95.6 | 97.1 | 97.7 |
| 9 | 24559-113 | 1.3 Co | MeOH | 1.1 | 1.53 | 1.17 | 95.1 | 96.9 | 97.6 |
| 10 | 24559-113 | 1.3 Co | MeOH | 1.2 | 3.05 | 2.35 | 76.8 | 80.6 | 83.9 |

*Not an example of the present invention.

TABLE 1A

| Run # | Catalyst | Al/M ratio | alcohol | molar alcohol/Li | free alcohol/M | free alcohol/Al | % conv @ 1 hr | % conv @ 2 hr | % conv @ 3 hr |
|---|---|---|---|---|---|---|---|---|---|
| *11 | 24559-113 | 1.3 Co | MeOH | 1.3 | 4.58 | 3.52 | 41.7 | 52.1 | 57.2 |
| 12 | 24559-113 | 1.3 Co | MeOH/2-EH | 1/.2 | 3.05 | 2.35 | 92.7 | 95.6 | 96.6 |
| *13 | 24559-114 | 1.3 Ni | MeOH | 1.0 | 0.00 | 0.00 | 43.0 | 69.2 | 73.5 |
| *14 | 24559-114 | 1.3 Ni | MeOH | 1.1 | 1.53 | 1.17 | 82.9 | 85.0 | 85.8 |
| *15 | 24559-161 | 1.6 Ni | MeOH | 1.1 | 1.53 | 0.95 | 82.6 | 86.0 | 87.2 |
| *16 | 24559-161 | 1.6 Ni | MeOH | 1.2 | 3.05 | 1.91 | 62.4 | 68.6 | 71.2 |
| *17 | 24559-161 | 1.6 Ni | MeOH | 1.3 | 4.58 | 2.86 | 78.2 | 81.9 | 83.8 |
| *18 | 24559-114 | 1.6 Ni | 2-EH/MeOH | 0.2/1 | 3.05 | 2.35 | 70.6 | 78.0 | 81.6 |

TABLE 1A-continued

| Run # | Catalyst | Al/M ratio | alcohol | molar alcohol/Li | free alcohol/M | free alcohol/Al | % conv @ 1 hr | % conv @ 2 hr | % conv @ 3 hr |
|---|---|---|---|---|---|---|---|---|---|
| *19 | 24559-115 | 2.0 Ni | MeOH | 1.0 | 0.00 | 0.00 | 90.5 | 93.1 | 94.1 |
| *20 | 24559-115 | 2.0 Ni | MeOH | 1.1 | 1.53 | 0.76 | 89.1 | 90.9 | 91.4 |
| *21 | 24559-25 | 2.0 Ni | MeOH | 1.1 | 1.53 | 0.76 | 90.9 | 92.7 | 93.3 |
| *22 | 24559-25 | 2.0 Ni | MeOH | 1.2 | 3.05 | 1.53 | 88.2 | 89.8 | 90.2 |
| *23 | 24559-25 | 2.0 Ni | MeOH | 1.3 | 4.58 | 2.29 | 86.2 | 87.3 | 87.8 |
| *24 | 24559-115 | 2.0 Ni | 2-EH/MeOH | 0.2/1 | 3.05 | 1.53 | 88.9 | 91.0 | 92.1 |
| *25 | 24559-115 | 2.0 Ni | 2-EH/MeOH | 0.3/1 | 4.58 | 2.29 | 83.4 | 85.9 | 86.5 |

*Not an example of the present invention.

Example 2

Experiments are conducted using a master batch of a triblock copolymer precursor solution. The polymer is a linear S-B-S triblock copolymer having polystyrene end blocks and a rubbery polybutadiene mid block. The polymer has a bound styrene content of 30% and a number average molecular weight of about 50,000.

The master batch is prepared in a pilot plant reactor at 20% wt polymer in cyclohexane/diethylether solution and terminated with methanol. All hydrogenations are conducted in batch mode in 4 liter ZIPPERCLAVE reactors (1560 g cement charge) at 75° C., 700 psig H2 (50.21 kgf/cm$^2$), 1000 rpm catalyst concentration was 2.5 ppm M/polymer solution (12.5 ppm M/polymer, M=Co or Ni). The polymer is terminated, catalysts are prepared and the hydrogenations are performed substantially identically to Example 1 except where noted in the Table. The resultant materials are tested as in Example 1.

Selection of metals, alcohols, aluminum to metal ratios, and alcohol to Li ratios are varied and the results are reported in Table 2.

The master batch is prepared in a pilot plant at 14.3% wt polymer in cyclohexane using diethoxy propane as a modifier. All hydrogenations are performed in batch mode in a 1.5 liter MEDIMEX* autoclave (800 g cement charge) at 40° C., 30 bar H2 (30.6 kgf/cm$^2$), 15 1200 rpm. (*MEDIMEX is a trade designation of the Medimex Company). Catalyst concentration is 0.4-1.0 ppm Co/solution. Catalysts are prepared as a 500 ppm Co/catalyst solution by diluting the Co carboxylate in cyclohexane and slowly adding triethylaluminum to achieve 2.2/1 molar ratio of Al/Co. The polymer solution is charged to the reactor and heated to 40° C. The required amount of alcohol to achieve a ratio of alcohol to Li of 1.2:1 is added as a solution in cyclohexane via high-pressure injection into the reactor. After thorough mixing for about 30 minutes to ensure that the polymer termination is complete, the catalyst solution is added and the reactor is pressurized and hydrogenation began. The hydrogenations are sampled and analyzed by $^1$H NMR to determine the degree of conversion of the alkyl unsaturation.

The alcohols used for termination are varied and the results are reported in Table 3.

TABLE 2

| Run # | Catalyst | Al/M ratio | Alcohol | molar alcohol/Li | free alcohol/M | free alcohol/Al | % conv @ 1 hr | % conv @ 2 hr | % conv @ 3 hr |
|---|---|---|---|---|---|---|---|---|---|
| 1 | 24559-111 | 2 Co | MeOH | 1.0 | 0.00 | 0.00 | 86.9 | 92.1 | 93.7 |
| 2 | 24559-111 | 2 Co | MeOH | 1.1 | 10.20 | 5.10 | 90.4 | 94.6 | 95.8 |
| 3 | 24559-111 | 2 Co | MeOH | 1.2 | 19.90 | 9.95 | 69.0 | 81.7 | 87.5 |
| *4 | 24559-111 | 2 Co | MeOH | 1.3 | 30.80 | 15.40 | 67.4 | 79.4 | 84.2 |
| 5 | 24559-111 | 2 Co | 2-EH | 1.0 | 0.00 | 0.00 | 84.7 | 91.1 | 93.1 |
| 6 | 24559-111 | 2 Co | 2-EH | 1.1 | 10.20 | 5.10 | 83.9 | 90.7 | 93.0 |
| 7 | 24559-111 | 2 Co | 2-EH | 1.2 | 19.90 | 9.95 | 86.1 | 92.7 | 94.3 |
| 8 | 24559-111 | 2 Co | 2-EH | 1.3 | 30.80 | 15.40 | 85.4 | 90.9 | 92.4 |
| *9 | 24559-115 | 2 Ni | MeOH | 1.1 | 12.80 | 6.40 | 72.2 | 77.7 | 79.5 |
| *10 | 24559-115 | 2 Ni | MeOH | 1.2 | 25.00 | 12.50 | 70.2 | 74.3 | 76.3 |
| *11 | 24559-115 | 2 Ni | MeOH | 1.3 | 38.00 | 19.00 | 60.5 | 65.2 | 67.5 |
| *12 | 24559-115 | 2 Ni | 2-EH | 1.1 | 12.80 | 6.40 | 44.1 | 49.5 | 52.1 |
| *13 | 24559-115 | 2 Ni | 2-EH | 1.2 | 25.00 | 12.50 | 31.7 | 44.6 | NA |

*Not an example of the present invention.

Example 3

The experiments are conducted using a master batch of a triblock copolymer precursor solution. The polymer is a linear S-B-S triblock copolymer having polystyrene end blocks and a rubbery poly-butadiene mid block. The polymer has a bound styrene content of 30% and a number average molecular weight of about 67,000.

TABLE 3

| Alcohol | Initial rate (mmol/min) | Conversion after 2 hours (% wt) |
|---|---|---|
| Methanol | 15 | 77 |
| 1-butanol | 34 | 67 |
| 1-octanol | 37 | 75 |
| i-propanol | 39 | 68 |
| s-butanol | 36 | 67 |

TABLE 3-continued

| Alcohol | Initial rate (mmol/min) | Conversion after 2 hours (% wt) |
|---|---|---|
| cyclohexanol | 30 | 81 |
| 2-ethyl-1-butanol | 61 | 87 |
| 2-ethyl-1-hexanol | 71 | 97 |
| neopentylalcohol | 69 | 92 |
| t-butanol | 75 | 94 |
| 2,6-di-t-butyl-4-methylphenol | 60 | 82 |
| *2,6-dibenzyl-4-methylphenol | 1 | 5 |
| *4-methylphenol | 0 | 0 |
| *4-methylbenzylalcohol | 7 | 27 |
| *2-phenylethylalcoholol | 6 | 10 |

*Not an example of the present invention.

Example 4

An Experiment is conducted using a master batch of a block styrene and isoprene copolymer precursor solution. The polymer is a linear S-I-S-I block copolymer. The polymer has a bound styrene content of 21% and a styrene molecular weight (Ms) of 103,000.

The master batch is prepared in a pilot plant reactor at 23% wt polymer in cyclohexane and terminated with methanol at a ratio of 1:1 MeOH:Li. All hydrogenations are conducted in batch mode in 4 liter ZIPPERCLAVE reactors (1560 g cement charge) at 75° C., 700 psig H2 (50.21 kgf/cm$^2$), at 1000 rpm. The catalyst concentration is 15 ppm Co/polymer solution and the ratio of Al/Co is 2.0. The polymer is terminated, catalyst is prepared and the hydrogenation is performed substantially identically to Example 1. The results from the testing are: after 60 minutes, 98.8% of the unsaturated bonds have been saturated; after 120 minutes, 99.6 percent of the unsaturated bonds have been saturated; and after 180 minutes, 99.8% of the unsaturated bonds have been saturated.

Example 5

The experiments are conducted using a master batch of a linear triblock copolymer precursor solution. The polymer is a linear triblock copolymer of styrene and butadiene, S-B-S, with a bound styrene content of 33% and having a number average molecular weight of about 181,000.

The master batch is prepared in a pilot plant reactor at a concentration of 12% wt polymer in a cyclohexane/diethylether solution and terminated with hydrogen or stoichiometrically with methanol.

All hydrogenations are conducted in batch mode in 4 liter ZIPPERCLAVE reactors (150 g cement charge) at 750° C., 700 psig (50.21 kgf/cm$^2$) H$_2$, 1000 rpm, and catalyst concentration is 4.5 ppm M/solution (37.5 ppm M/polymer, M=Co or Ni). The polymer is alcohol terminated as in Example 1. The polymer is hydrogen terminated by sparging the living polymer solution with hydrogen for 30 minutes or until the color disappears. The catalysts are prepared and the hydrogenations are performed substantially identically to Example 1 except where noted in the Table. The resultant materials are tested as in Example 1 and the results are reported in Table 4.

TABLE 4

| Catalyst Type | Termination Species | % Unsaturation Conversion |
|---|---|---|
| 1.0 Al/Co | H$_2$ | 99.4 |
| 1.0 Al/Co | MeOH | 98.5 |
| *1.0 Al/Ni | H$_2$ | 94.8 |
| *1.0 Al/Ni | MeOH | 90.9 |

*Not an example of the present invention.

Example Summary

The examples and comparative examples show the advantages of the method of the present invention over conventional methods for producing hydrogenated block copolymers. In Example 1, the experiments with the very high molecular weight polymer show that Co catalysts have a higher activity than Ni catalysts in the presence of linear alcohols up to a molar ratio of 1.2:1 terminating alcohol:Li in the living polymer. Also shown in Example 1 is that the branched alcohols do not suppress catalytic activity or suppress it to much lower extent than the linear alcohols. In Example 2, the advantage of Co over nickel catalysts under the conditions of the method of the present invention were even more significant with the lower molecular weight polymer. In Example 3, the impact on catalytic activity by various branched and linear alcohols is illustrated. Also shown in this example is the effect of acidic phenols on catalytic activity. Example 4 is a an example of the method of the present invention used to hydrogenate an isoprene and styrene block copolymer. Example 5 illustrates the advantage of the method of the present invention for hydrogenation of hydrogen terminated block copolymers.

We claim:

1. A method for making selectively hydrogenated block copolymers of vinyl aromatic hydrocarbons and conjugated dienes comprising:
    a) anionically polymerizing vinyl aromatic hydrocarbons and conjugated dienes to produce block copolymers with living chain ends;
    b) terminating the living chain ends with an alcohol, or a mixture of hydrogen and alcohol to prepare a terminated block copolymer; and
    c) contacting the terminated block copolymers with hydrogen at a temperature of from 20 to 175° C. in the presence of a catalyst prepared by combining a cobalt carboxylate with an aluminum alkyl,
    wherein the alcohol is a linear alcohol or a mixture of a linear alcohol and a branched alcohol, and wherein
    (i) if the polymer is terminated with the linear alcohol, the linear alcohol is used to terminate the living chain ends in an amount such that the alcohol:living chain end molar ratio is from 0.05 to 1.2;
    (ii) if the polymer is terminated with the mixture of a linear alcohol and a branched alcohol, the linear alcohol is used to terminate the living chain ends in an amount such that the linear alcohol:living chain end molar ratio is from 0.05 to 1.2,
    and wherein the linear alcohol is methanol, ethanol, n-propanol, n-butanol, n-pentanol or a mixture thereof.

2. The method of claim 1 wherein the alcohol is a linear alcohol.

3. The method of claim 2 wherein the alcohol:living chain end molar ratio is from 0.5:1 to 1.19:1.

4. The method of claim 3 wherein the alcohol:living chain end molar ratio is from 1.0:1 to 1.1:1.

5. The method of claim 1 wherein the alcohol is a mixture of methanol and 2-ethyl-1-hexanol.

6. The method of claim 1 wherein the alcohol is a mixture of linear alcohol and branched alcohol.

7. The method of claim 6 wherein the branched alcohol is selected from the group consisting of the tertiary alcohols, the β-branched primary aliphatic alcohols, the β,β-branched primary aliphatic alcohols, and the β,β-branched secondary aliphatic alcohols.

8. The method of claim 7 wherein the branched alcohol is selected from the group consisting of t-butanol, neopentyl alcohol, and 2-ethyl-1-hexanol.

9. The method of claim 1 wherein the catalyst is prepared using a carboxylate selected from the group consisting of cobalt neodecanoate, cobalt hexanoate, cobalt ethylhexanoate, cobalt heptanoate, cobalt octanoate, cobalt nonanoate, cobalt decanoate, cobalt dodecanoate, cobalt versatate, cobalt myristoate, cobalt palmidoate, cobalt stearate, cobalt oleoate, cobalt linoleoate, cobalt rhodinoate, cobalt naphthanoate, cobalt cyclohexylcarboxiate, cobalt salts of abietic resin acids, cobalt benzoate, and cobalt salts of alkyl-substituted aromatic acids in which the alkyl substitution has from 1 to 20 carbon atoms.

10. The method of claim 9 wherein the catalyst is prepared using cobalt neodecanoate.

11. The method of claim 1 wherein the catalyst is prepared using a carboxylate selected from the group consisting of cobalt ethyihexanoate, cobalt heptanoate, cobalt nonanoate, cobalt dodecanoate, cobalt versatate, cobalt myristoate, cobalt palmidoate, cobalt stearate, cobalt oleoate, cobalt linoleoate, cobalt rhodinoate, cobalt naphthanoate, cobalt cyclohexylcarboxiate, cobalt salts of abietic resin acids, cobalt benzoate, and cobalt salts of alkyl-substituted aromatic acids in which the alkyl substitution has from 1 to 20 carbon atoms.

12. The method of claim 1 wherein the linear alcohol is methanol.

13. A method for making selectively hydrogenated block copolymers of vinyl aromatic hydrocarbons and conjugated dienes comprising:
   a) anionically polymerizing vinyl aromatic hydrocarbons and conjugated dienes to produce block copolymers with living chain ends;
   b) terminating the living chain ends with a member from the group consisting of an alcohol, or a mixture of hydrogen and alcohol to prepare a terminated block copolymer; and
   c) contacting the terminated block copolymers with hydrogen at a temperature of from 20 to 175° C. in the presence of a catalyst prepared by combining a cobalt carboxylate with an aluminum alkyl,
   wherein
      the alcohol is a linear alcohol and the linear alcohol is used to terminate the living chain ends in an amount such that the alcohol:living chain end molar ratio is from 0.05 to 1.2,
      and wherein the linear alcohol is methanol, ethanol, n-propanol, n-butanol, n-pentanol or a mixture thereof.

14. The method of claim 13 wherein the catalyst is prepared using cobalt neodecanoate.

15. The method of claim 13 wherein the linear alcohol is methanol.

16. A method for making selectively hydrogenated block copolymers of vinyl aromatic hydrocarbons and conjugated dienes comprising:
   a) anionically polymerizing vinyl aromatic hydrocarbons and conjugated dienes to produce block copolymers with living chain ends;
   b) terminating the living chain ends with a member from the group consisting of an alcohol, hydrogen, and mixtures thereof, to prepare a terminated block copolymer; and
   c) contacting the terminated block copolymers with hydrogen at a temperature of from 20 to 175° C. in the presence of a catalyst prepared by combining a cobalt carboxylate with an aluminum alkyl, wherein the carboxylate is cobalt neodecanoate,
   wherein
   (i) if the polymer is terminated with an alcohol and the alcohol is linear alcohol, the linear alcohol is used to terminate the living chain ends in an amount such that the alcohol:living chain end molar ratio is from 0.05 to 1.2;
   (ii) if the polymer is terminated with an alcohol and the alcohol is a branched alcohol, the branched alcohol is used to terminate the living chain ends in an amount such that the alcohol:living chain end molar ratio is from 0.05 to about 3.0; and
   (iii) if the polymer is terminated with an alcohol and the alcohol is a mixture of a linear alcohol and a branched alcohol, the linear alcohol is used to terminate the living chain ends in an amount such that the linear alcohol:living chain end molar ratio is from 0.05 to 1.2.

17. The method of claim 16 wherein the alcohol is a linear alcohol.

18. The method of claim 16 wherein the alcohol:living chain end molar ratio is from 0.5:1 to 1.19:1.

19. The method of claim 16 wherein the alcohol:living chain end molar ratio is from 1.0:1 to 1.1:1.

20. The method of claim 16 wherein the alcohol is selected from the group consisting of methanol, 2-ethyl-1-hexanol, and mixtures thereof.

21. The method of claim 16 wherein the alcohol is a branched alcohol.

22. The method of claim 21 wherein the branched alcohol is selected from the group consisting of the tertiary alcohols, the β-branched primary aliphatic alcohols, the β,β-branched primary aliphatic alcohols, and the β,β-branched secondary aliphatic alcohols.

23. The method of claim 22 wherein the branched alcohol is selected from the group consisting of t-butanol, neopentyl alcohol, and 2-ethyl-1-hexanol.

24. The method of claim 17 wherein the linear alcohol is selected from the group consisting of methanol, ethanol, n-propanol, n-butanol, n-pentanol or a mixture thereof.

25. The method of claim 17 wherein the linear alcohol is methanol.

26. A method for making selectively hydrogenated block copolymers of vinyl aromatic hydrocarbons and conjugated dienes comprising:
   a) anionically polymerizing vinyl aromatic hydrocarbons and conjugated dienes to produce block copolymers with living chain ends;
   b) terminating the living chain ends with a member from the group consisting of an alcohol, hydrogen, and mixtures thereof, to prepare a terminated block copolymer; and
   c) contacting the terminated block copolymers with hydrogen at a temperature of from 20 to 175° C. in the presence of a catalyst prepared by combining a cobalt carboxylate with an aluminum alkyl, wherein the catalyst is prepared using a carboxylate selected from the group consisting of cobalt ethylhexanoate, cobalt versatate, cobalt myristoate, cobalt palmidoate, cobalt stearate, cobalt oleoate, cobalt linoleoate, cobalt rhodinoate, cobalt naphthanoate, cobalt cyclohexylcarboxiate, cobalt salts of abietic resin acids, cobalt benzoate, and cobalt salts of alkyl-substituted aromatic acids in which the alkyl substitution has from 1 to 20 carbon atoms, wherein:
(i) if the polymer is terminated with an alcohol and the alcohol is linear alcohol, the linear alcohol is used to terminate the living chain ends in an amount such that the alcohol:living chain end molar ratio is from 0.05 to 1.2;
(ii) if the polymer is terminated with an alcohol and the alcohol is a branched alcohol, the branched alcohol is used to terminate the living chain ends in an amount such that the alcohol:living chain end molar ratio is from 0.05 to about 3.0; and
(iii) if the polymer is terminated with an alcohol and the alcohol is a mixture of a linear alcohol and a branched alcohol, the linear alcohol is used to terminate the living chain ends in an amount such that the linear alcohol:living chain end molar ratio is from 0.05 to 1.2.

27. The method of claim 11, wherein the catalyst is prepared using a carboxylate selected from the group consisting of cobalt ethyihexanoate, cobalt versatate, cobalt myristoate, cobalt palmidoate, cobalt stearate, cobalt oleoate, cobalt linoleoate, cobalt rhodinoate, cobalt naphthanoate, cobalt cyclohexylcarboxiate, cobalt salts of abietic resin acids, cobalt benzoate, and cobalt salts of alkyl-substituted aromatic acids in which the alkyl substitution has from 1 to 20 carbon atoms.

* * * * *

UNITED STATES PATENT AND TRADEMARK OFFICE
CERTIFICATE OF CORRECTION

PATENT NO. : 7,390,856 B2 Page 1 of 1
APPLICATION NO. : 10/362145
DATED : June 24, 2008
INVENTOR(S) : Kimberly A. Johnson et al.

It is certified that error appears in the above-identified patent and that said Letters Patent is hereby corrected as shown below:

Col. 13, Claim 11, line 28, delete "ethyihexanoate" and insert --ethylhexanoate--.

Col. 13, Claim 11, line 32, delete "hexylcarboxiate" and insert --hexylcarboxlate--.

Col. 15, Claim 26, line 6, delete "hexylcarboxiate" and insert --hexylcarboxlate--.

Col. 16, Claim 27, line 11, delete "ethyihexanoate" and insert --ethylhexanoate--.

Col. 16, Claim 27, line 14, delete "hexylcarboxiate" and insert --hexylcarboxlate--.

Signed and Sealed this

Thirtieth Day of December, 2008

JON W. DUDAS
*Director of the United States Patent and Trademark Office*